US012658171B2

(12) United States Patent
Aval

(10) Patent No.: US 12,658,171 B2
(45) Date of Patent: Jun. 16, 2026

(54) SYSTEMS AND METHODS FOR ADJUSTING HARMONIC CANCELLATION

(71) Applicant: Bose Corporation, Framingham, MA (US)

(72) Inventor: Yashar M. Aval, Belmont, MA (US)

(73) Assignee: Bose Corporation, Framingham, MA (US)

(*) Notice: Subject to any disclaimer, the term of this patent is extended or adjusted under 35 U.S.C. 154(b) by 231 days.

(21) Appl. No.: 18/405,291

(22) Filed: Jan. 5, 2024

(65) Prior Publication Data

US 2025/0225974 A1 Jul. 10, 2025

(51) Int. Cl.
*G10K 11/178* (2006.01)

(52) U.S. Cl.
CPC .. *G10K 11/17883* (2018.01); *G10K 11/17853* (2018.01); *G10K 2210/128* (2013.01)

(58) Field of Classification Search
CPC ....... G10K 11/17854; G10K 11/17883; G10K 2210/3032; G10K 11/17833; G10K 11/1781; G10K 2210/511; G10K 2210/12821; G10K 2210/1282; H04R 1/1083
See application file for complete search history.

(56) References Cited

U.S. PATENT DOCUMENTS

| | | | |
|---|---|---|---|
| 5,953,428 | A | 9/1999 | Silverberg et al. |
| 11,417,306 | B2 | 8/2022 | Aval |
| 2010/0172511 | A1 | 7/2010 | Togawa et al. |
| 2020/0357378 | A1 | 11/2020 | Bastyr et al. |
| 2021/0193103 | A1 | 6/2021 | Zollner |
| 2022/0208164 | A1 | 6/2022 | Aval |

FOREIGN PATENT DOCUMENTS

| | | | |
|---|---|---|---|
| WO | 2022182351 | A1 | 9/2022 |

OTHER PUBLICATIONS

International Search Report and the Written Opinion of the International Searching Authority, PCT Application No. PCT/US2024/061692, dated Apr. 25, 2025, pp. 1-15.

*Primary Examiner* — Kile O Blair
(74) *Attorney, Agent, or Firm* — Bond, Schoeneck & King, PLLC

(57) ABSTRACT

A harmonic cancellation system including a feedback sensor, a controller, and a speaker is provided. The feedback sensor is disposed within a cancellation zone within a cabin of a vehicle. The feedback sensor produces a feedback signal corresponding to audio within the cancellation zone. The controller is configured to produce a harmonic cancellation signal that, when transduced into an acoustic signal, reduces audible harmonics from a harmonic noise source at a harmonic frequency within the cancellation zone. The harmonic cancellation signal is adjusted according to a comparison of the feedback signal at the harmonic frequency to at least one of a saturation threshold or the feedback signal at one or more sideband frequencies offset from the harmonic frequency. The speaker is disposed within the cabin, receives the harmonic cancellation signal, and transduces the harmonic cancellation signal into an acoustic harmonic cancellation signal within the cancellation zone.

18 Claims, 8 Drawing Sheets

SYSTEMS AND METHODS FOR ADJUSTING HARMONIC CANCELLATION

BACKGROUND

The present disclosure generally relates to systems and methods for adjusting harmonic cancellation in a motor vehicle.

SUMMARY

All examples and features mentioned below can be combined in any technically possible way.

Generally, in one aspect, a harmonic cancellation system is provided. The harmonic cancellation system includes a feedback sensor. The feedback sensor is disposed within a cancellation zone within a cabin of a vehicle. The feedback sensor is configured to produce a feedback signal corresponding to audio within the cancellation zone.

The harmonic cancellation system further includes a controller. The controller is configured to produce a harmonic cancellation signal that, when transduced into an acoustic signal, reduces audible harmonics from a harmonic noise source at a harmonic frequency within the cancellation zone. The harmonic cancellation signal is adjusted according to a comparison of the feedback signal at the harmonic frequency to at least one of a saturation threshold or the feedback signal at one or more sideband frequencies offset from the harmonic frequency.

The harmonic cancellation system further includes a speaker disposed within the cabin and configured to receive the harmonic cancellation signal and to transduce the harmonic cancellation signal into an acoustic harmonic cancellation signal within the cancellation zone.

According to an example, the controller is further configured to (1) generate a complex conjugate oscillation signal based on an oscillation signal; (2) generate a first frequency offset oscillation signal by adding the frequency offset to the complex conjugate oscillation signal; (3) generate a second frequency offset oscillation signal by subtracting the frequency offset from the complex conjugate oscillation signal; (4) generate, via a downconverter, a baseband feedback signal, a first offset baseband signal, and a second offset baseband signal by mixing down the feedback signal according to the oscillation signal, the first frequency offset oscillation signal, and the second frequency offset oscillation signal; and (5) generate, via a saturation low pass filter (LPF), a saturated feedback signal, a first offset saturated signal, and a second offset saturated signal by filtering the baseband feedback signal, the first offset baseband signal, and the second offset baseband signal. The harmonic cancellation signal is determined based on the saturated feedback signal, the first offset saturated signal, and the second offset saturated signal.

According to an example, the controller is further configured to determine the frequency offset based on an engine RPM signal.

According to an example, the saturation LPF is configured to generate, via a saturation limiter, the saturated feedback signal based on a baseband sum of the baseband feedback signal and a time delayed saturated feedback signal. The time delayed saturated feedback signal is determine based on the saturation threshold.

According to an example, the saturation LPF is further configured to (1) generate, via the saturation limiter, the first offset saturated signal based on a first offset sum of the first offset baseband signal and a first time delayed offset saturated signal, wherein the first time delayed offset saturated signal is determine based on the saturation threshold; and (2) generate, via, the saturation limiter, the second offset saturated signal based on a second offset sum of the second offset baseband signal and a second time delayed offset saturated signal, wherein the second time delayed offset saturated signal is determine based on the saturation threshold.

According to an example, the saturation threshold is a soft limit.

According to an example, if an amplitude of the baseband sum exceeds the soft limit, an amplitude of the saturated feedback signal is reduced relative to the amplitude of the baseband feedback signal.

According to an example, (1) if an amplitude of the first offset sum exceeds the soft limit, an amplitude of the first offset saturated signal is reduced relative to the amplitude of the first offset baseband signal, and (2) if an amplitude of the second offset sum exceeds the soft limit, an amplitude of the second offset saturated signal is reduced relative to the amplitude of the second offset baseband signal.

According to an example, the saturation threshold is a hard limit.

According to an example, if an amplitude of the baseband sum exceeds the hard limit, an amplitude of the saturated feedback signal is reduced to the hard limit.

According to an example, (1) if an amplitude of the first offset sum exceeds the hard limit, an amplitude of the first offset saturated signal is reduced to the hard limit; and (2) if an amplitude of the second offset sum exceeds the hard limit, an amplitude of the second offset saturated signal is reduced to the hard limit.

According to an example, the controller is further configured to generate, via a time domain delay generator, a first delayed offset signal based on the first offset saturated signal and a second delayed offset signal based on the second offset saturated signal.

According to an example, the controller is further configured to reduce the harmonic cancellation signal to a minimum harmonic cancellation level if an energy level of the saturated feedback signal is less than or equal to an energy level of at least one of the first offset saturated signal, the second offset saturated signal, the first delayed offset signal, or the second delayed offset signal.

According to an example, the controller is further configured to reduce the harmonic cancellation signal to a harmonic cancellation level greater than a minimum harmonic cancellation level if (i) an energy level of the saturated feedback signal is greater than energy levels of the first offset saturated signal, the second offset saturated signal, the first delayed offset signal, and the second delayed offset signal and (ii) the energy level of the saturated feedback signal is less than an expected signal level.

According to an example, the frequency offset is 2 Hz.

According to an example, the controller is further configured to (1) generate, via a leaky integrator, a baseband cancellation signal based on the baseband feedback signal; and (2) generate, via an upconverter, the harmonic cancellation signal by mixing the baseband cancellation signal and the oscillation signal.

According to an example, the controller is configured to adjust a step size and/or a forgetting factor of the leaky integrator based on the comparison.

Generally, in another example, a method for harmonic cancellation is provided. The method includes (1) producing, via a feedback sensor disposed within a cancellation zone within a cabin of a vehicle, a feedback signal corresponding to audio within the cancellation zone; (2) producing, via a controller, a harmonic cancellation signal that, when transduced into an acoustic signal, reduces audible harmonics from a harmonic noise source at a harmonic frequency within the cancellation zone, wherein the harmonic cancellation signal is adjusted according to a comparison of the feedback signal at the harmonic frequency to at least one of a saturation threshold or the feedback signal at one or more sideband frequencies offset from the harmonic frequency; and (3) transducing, via a speaker disposed within the cabin and configured to receive the harmonic cancellation signal, the harmonic cancellation signal into acoustic harmonic cancellation audio to reduce the audible harmonics within the cancellation zone.

According to an example, the method further includes (1) generating, via the controller, a complex conjugate oscillation signal based on the oscillation signal; (2) generating, via the controller, a first frequency offset oscillation signal by adding a frequency offset to the complex conjugate oscillation signal; (3) generating, via the controller, a second frequency offset oscillation signal by subtracting the frequency offset from the complex conjugate oscillation signal; (4) generating, via a downconverter implemented by the controller, a baseband feedback signal, a first offset baseband signal, and a second offset baseband signal by mixing down the feedback signal according to the oscillation signal, the first frequency offset oscillation signal, and the second frequency offset oscillation signal; and (5) generating, via a saturation LPF implemented by the controller, a saturated feedback signal, a first offset saturated signal, and a second offset saturated signal by filtering the baseband feedback signal, the first offset baseband signal, and the second offset baseband signal, wherein the cancellation adjustment signal is determined based on the saturated feedback signal, the first offset saturated signal, and the second offset saturated signal.

Generally, in a further example, a system to control operation of a harmonic canceller is provided. The system includes a feedback input to receive a feedback signal from a feedback sensor within a cancellation zone of a cabin of a vehicle. The feedback signal corresponds to audio with the cancellation zone.

The system further includes a controller configured to produce a harmonic cancellation signal that, when transduced into an acoustic signal, reduces audible harmonics from a harmonic noise source at a harmonic frequency within the cancellation zone. The harmonic cancellation signal is adjusted according to a comparison of the feedback signal at the harmonic frequency to at least one of a saturation threshold or the feedback signal at one or more sideband frequencies offset from the harmonic frequency.

The system further includes an output configured to adjust one or more parameters of the harmonic canceller according to the comparison.

The details of one or more implementations are set forth in the accompanying drawings and the description below. Other features, objects, and advantages will be apparent from the description and the drawings, and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Vehicle engines (including both internal combustion engines and electric motors) generate pronounced harmonics (sounds emitted at integer multiples of a fundamental frequency) during operation, often due to the rotation of various elements within the engine, such as the crankshaft. Previous harmonic cancellation systems tended to rely on the use of a microphone disposed in the cabin to detect the harmonics to be cancelled. However, these systems may produce undesired audio artifacts based on audio captured by the microphone within the cabin. In some examples, this audio could correspond to a conversation between a driver and a passenger. In other examples, this audio could correspond to any sharp, loud noise detectable within the cabin. These noises could include, in some non-limiting examples, a knock on a window, the passenger striking an interior panel of the cabin with their foot, the driver or passenger tapping on an interior panel with their fingers, the driving striking a pedal with a hard sole of a dress shoe, etc. If the conversation or the sharp, loud noise generates audio in frequencies overlapping with engine harmonic noise, the engine harmonic cancellation system may attempt to cancel out certain frequency aspects of the conversation or noise, leading to audio artifacts such as a ringing effect. When the vehicle is driven, these audio artifacts are typically masked by road noise. However, when the vehicle is parked, these audio artifacts may be noticeable to the driver and passengers of the vehicle, particularly if the harmonic cancellation system is attempting to cancel noise corresponding to an air conditioning compressor or a cooling system during charging a battery of an electric vehicle.

Figure 1:
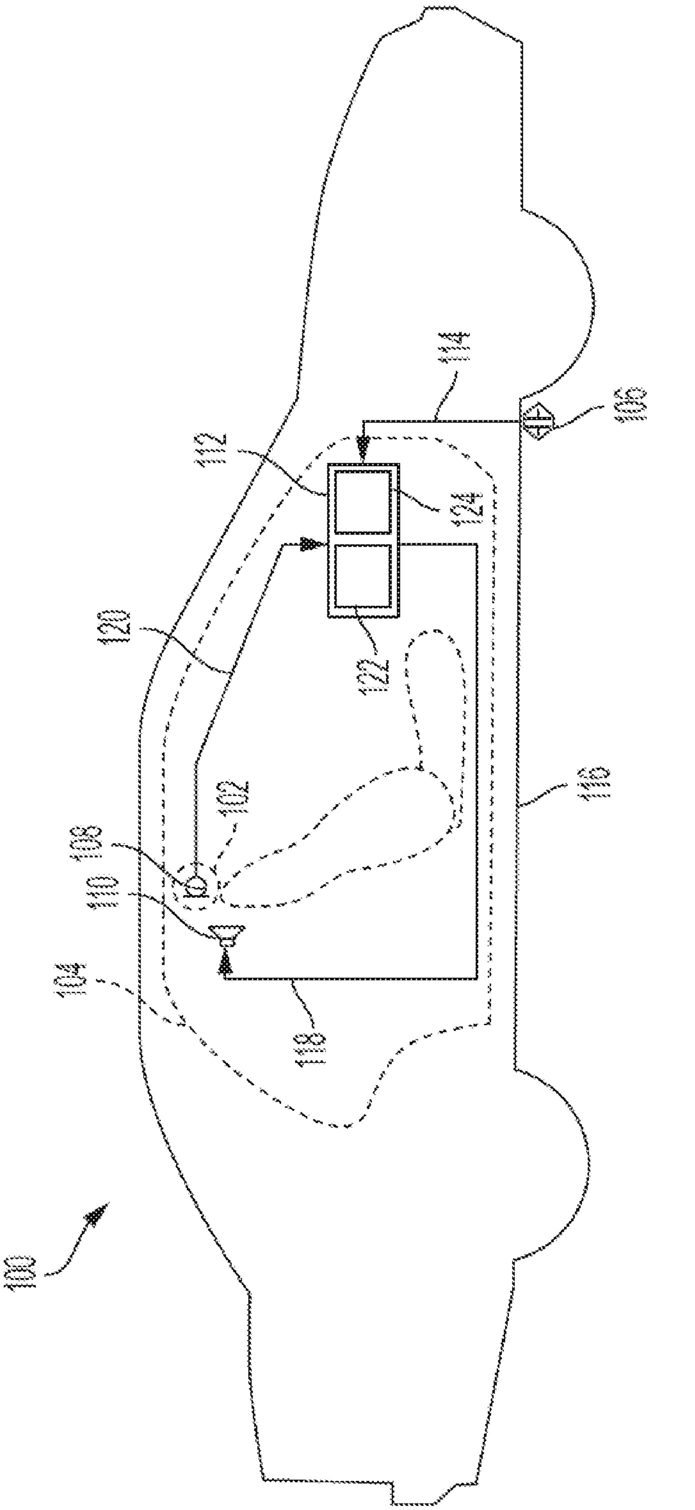
FIG. 1 depicts a schematic of an engine harmonic cancellation system implemented in a vehicle, according to an example.

FIG. 1 is a schematic view of an example harmonic cancellation system 100. Engine harmonic cancellation system 100 can be configured to destructively interfere with undesired engine harmonics in at least one cancellation zone 102 within a predefined volume 104 within a vehicle cabin. At a high level, this example of a harmonic cancellation system 100 can include a feedback sensor 108, a speaker 110, and a controller 112.

In the non-limiting example of FIG. 1, speaker 110 can, for example, be one or more speakers distributed in discrete locations about the perimeter of the predefined volume 104. (Also referred to as an actuator or acoustic transducer, a speaker is any device configured to receive an electrical signal and transduce it into an acoustic signal.) In an example, four or more speakers can be disposed within a vehicle cabin, each of the four speakers being located within a respective door of the vehicle and configured to project sound into the vehicle cabin. In alternate examples, speakers can be located within a headrest, or elsewhere in the vehicle cabin.

A harmonic cancellation signal 118 can be generated by controller 112 and provided to one or more speakers 110 in the predefined volume 104, which transduce the harmonic cancellation signal 118 to acoustic energy (i.e., sound waves). The acoustic energy produced as a result of harmonic cancellation signal 118 is approximately 180° (i.e., 180°±10°), out of phase with—and thus destructively interferes with—the undesired harmonics within the cancellation zone 102. The combination of sound waves generated from the harmonic cancellation signal 118 and the undesired harmonics in the predefined volume results in cancellation of the undesired harmonics, as perceived by a listener in a cancellation zone.

Because harmonic cancellation cannot be equal throughout the entire predefined volume, the harmonic cancellation system 100 is configured to create the greatest harmonic cancellation within one or more predefined cancellation zones 102 within the predefined volume. The harmonic cancellation within the cancellation zones 102 can cause a reduction in undesired harmonics by approximately 3 dB or more (although in varying examples, different amounts of harmonic cancellation can occur). It should thus be understood that "cancellation" as used in this disclosure does not refer to total cancellation but rather the reduction of the undesired engine harmonics in the cancellation zone 102. In certain examples, the engine harmonics can be reduced to a target value. In other examples, the undesired engine harmonics can be reduced to the extent possible. The portion of the engine harmonics that remains uncancelled within the cancellation zone is referred to in this disclosure as "residual" or "uncancelled" harmonics.

Feedback sensor 108, disposed within the predefined volume, generates a feedback signal 120 representative of sound within the cancellation zone 102. This sound may include harmonic noise, voices of a driver and one or more passengers, loud noises (such as a knock on the window or a passenger striking an interior panel of the cabin), and more. The harmonic noise may include noise generated by any rotating equipment of the vehicle, including an engine, motor, compressor, etc. In some examples, the harmonic noise includes noise generating by air conditioning compressors and/or cooling systems. The harmonic noise generated by air conditioning compressors and/or cooling systems may be overwhelmed by engine noise when the vehicle is in motion. However, the harmonic noise may be noticeable when the vehicle is parked, particularly if the vehicle is an electric vehicle. The sound may also include residual harmonics or artifacts resulting from the combination of the sound waves generated from the harmonic cancellation signal 118 and the sound within the cancellation zone 102. The feedback signal 120 is provided to controller 112 representing the sound within the cancellation zone 102. The feedback sensor 108 can be, for example, one or more microphones mounted within a vehicle cabin (e.g., in the roof, headrests, pillars, or elsewhere within the cabin).

It should be noted that the cancellation zone(s) 102 can be positioned remotely from the feedback sensor 108. In this case, as will be discussed below, the feedback signal 120 can be filtered to represent an estimate of the residual noise in the cancellation zone(s). In either case, the error signal will be understood to represent residual undesired harmonics in the cancellation zone.

In an example, the controller 112 can comprise a non-transitory storage medium 122 and processor 124. In an example, non-transitory storage medium 122 can store program code that, when executed by processor 124, implements the various filters, modules, components, and algorithms described below. For example, the controller can comprise a SHARC floating-point DSP processor programmed as such. However, it should be understood that controller 112 can comprise any suitable processor, FPGA, ASIC, or other suitable hardware, which includes combinations of multiple processors/hardware.

In some examples, the harmonic cancellation system 100 may also include a reference sensor 106 configured to generate reference signal(s) 114 representative of the undesired sound, or a source of the undesired sound, within predefined volume 104. For example, as shown in FIG. 1, reference sensor 106 can be an accelerometer, or a plurality of accelerometers, positioned to detect the harmonics produced by an engine. In various examples, the reference sensor 106 can be positioned in the engine compartment, in the vehicle cabin, in the vehicle chassis, or any other location suitable for detecting the engine harmonics.

Figure 2:
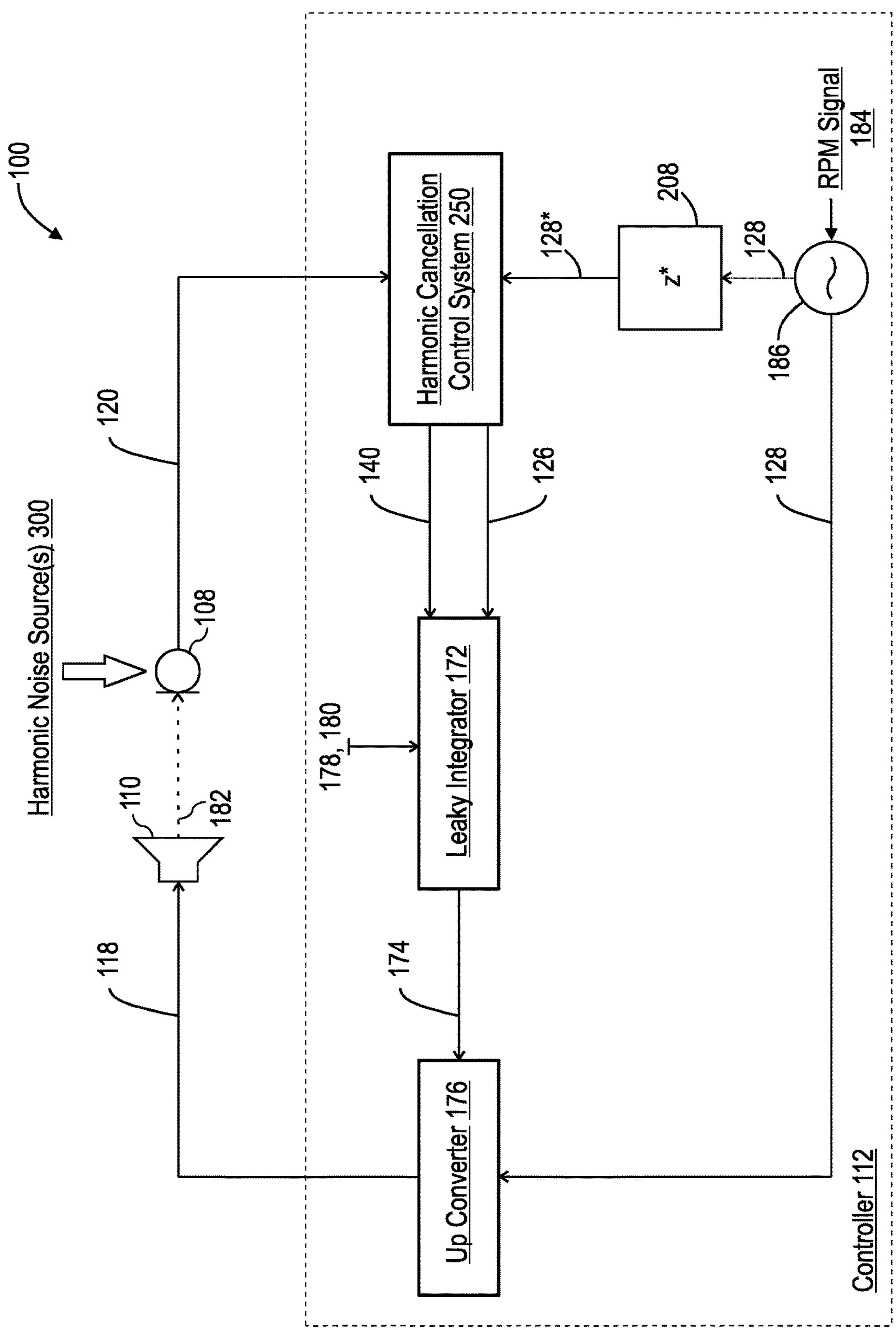
FIG. 2 depicts a block diagram of the engine harmonic cancellation system of FIG. 1, according to an example.

FIG. 2 depicts a block diagram of the harmonic cancellation system 100, including multiple components implemented by the controller 112. As shown in FIG. 2, the feedback sensor 108 is arranged to capture sounds corresponding to ambient noise within the cancellation zone 102 (as shown in FIG. 1). This ambient noise may correspond to a variety of sources, such as harmonic noise (including noise generated by air condition compressors and/or cooling systems), voices of a driver and one or more passengers, loud noises (such as a knock on the window or a passenger striking an interior panel of the cabin), and more. The harmonic noise is represented by one or more harmonic noise sources 300 in FIG. 2. The ambient noise captured by the feedback sensor 108 may be partially reduced or fully cancelled by acoustic harmonic cancellation signal 182 provided by the speaker 110. The feedback sensor 108 converts the combination of the ambient noise and the acoustic harmonic cancellation signal 182 into the feedback signal 120.

The feedback signal 120 is provided to a harmonic noise cancellation control system 250. As shown in further detail in FIGS. 3 and 4, the harmonic noise cancellation control system 250 includes a down converter 132 to convert the feedback signal 120 to baseband for further processing. A simplified expression of the harmonic content of feedback signal 120 can be represented in the time domain as a complex exponential by the following equation:

$$A\cos(\omega_0 t+\varphi_r)=\frac{A}{2}\left(e^{j\omega_0 t+\varphi_r}+e^{-j\omega_0 t+\varphi_r}\right) \tag{1}$$

where A is the amplitude and $\omega_0$ the angular frequency and $\varphi_r$ is the phase of the harmonic content. Not represented in this equation is some modulation that will provide some bandwidth to the signal; however, this equation is useful for illustrative purposes. Furthermore, it should be understood, that the harmonic noise sources 300 and the feedback signal 120 will contain harmonics at multiple frequencies at a single point in time (i.e., at various harmonic numbers). The system and method described herein can be repeated for each such harmonic frequency. Indeed, it should be understood that the equations presented in this disclosure are presented in a simplified form for the purposes of illustration only and should not be deemed exclusive or limiting.

Figure 4:
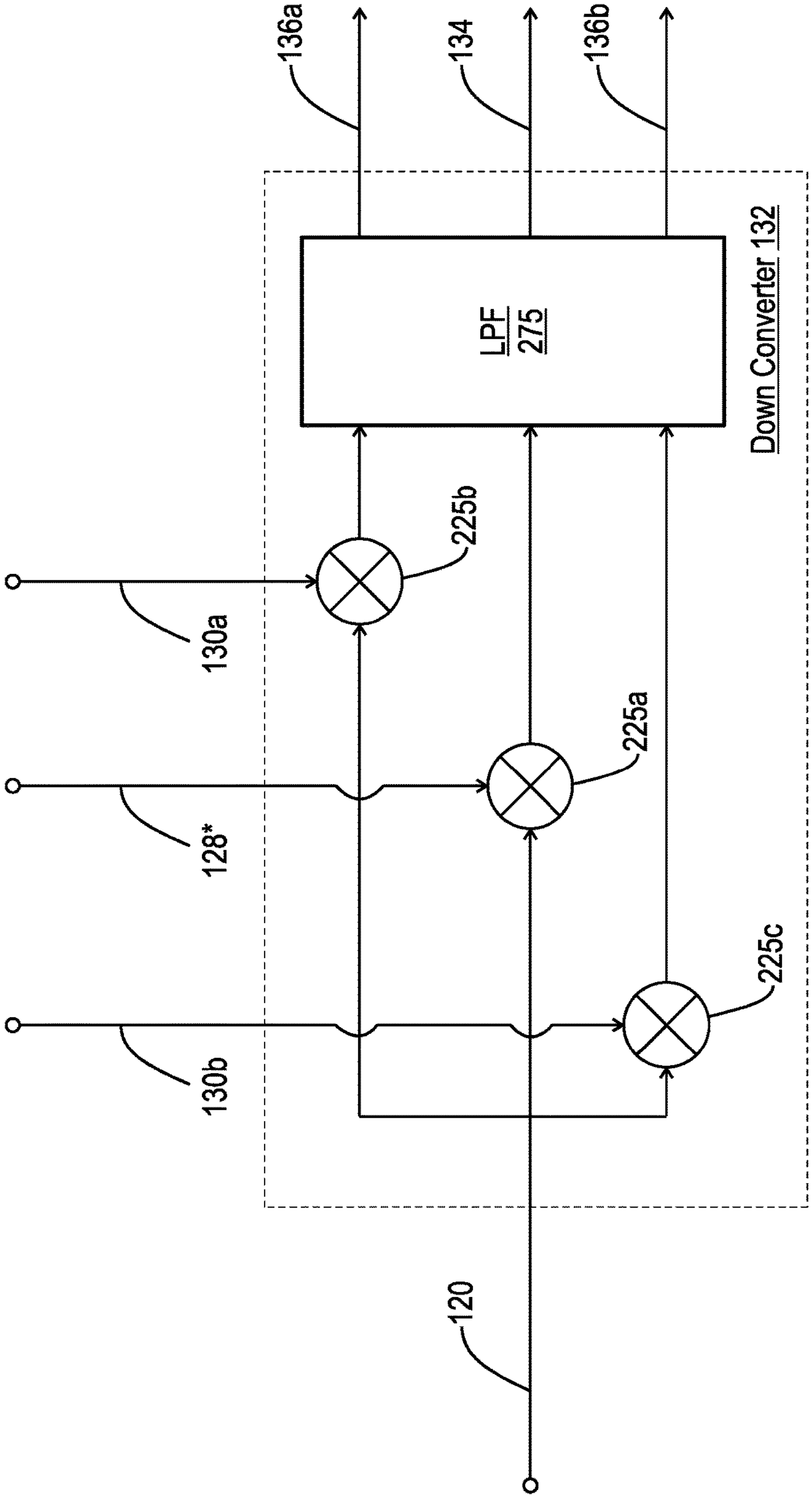
FIG. 4 depicts a block diagram of the down converter of FIG. 3, according to an example.

Down converter 132 converts the feedback signal 120 to baseband. The down converter 132 in the example shown, may include a multiplier 225 and a lowpass filter 275 as shown in FIG. 4. The multiplier 225 multiplies the feedback signal 120 by a value to shift the feedback signal 120 frequency $\omega_0$ down to baseband. More specifically, the multiplier 225 receives a complex conjugate oscillator signal 128* derived from complex-valued oscillator 186, producing an output that can be mathematically modeled as:

$$e^{j(\omega_0 t+\theta)} \tag{2}$$

where $\omega_0$ is again the angular frequency of the harmonic content of the feedback signal 120 and θ represents a phase introduced by the complex-valued oscillator (this phase will be removed later at up convert). The angular frequency $\omega_0$ of the oscillator signal 128 is selected according to information about the state of the engine and vehicle. For example, the revolutions per minute (RPM) of the vehicle engine is related to the harmonic noise. For example, generally the harmonic content increases in frequency as the RPM increases. Thus, the RPM of the vehicle engine can be used to select the target harmonic frequency $\omega_0$. The target harmonic frequency $\omega_0$ may correspond to any rotating equipment of the vehicle, including an engine, motor, compressor, etc. In the example of FIG. 2, an RPM signal 184 is provided to the oscillator 186 to select the target harmonic frequency $\omega_0$. In addition, other factors, such as the torque produced by the engine can modify which harmonic frequencies are produced at a particular RPM. For example, an engine that is revved at idle will produce different harmonic frequencies to an engine that is driven under load, although the engine reaches the same RPM in both cases. Thus, torque can be used to determine the harmonic order, and, accordingly, the appropriate target angular frequency $\omega_0$. (A look-up table can be employed to select the appropriate angular frequency $\omega_0$ of oscillator signal o according to the state of the engine or vehicle, e.g., RPM and/or torque, etc.). If the RPM signal 184 is unavailable, data from the reference signal 114 generated by the reference sensor 106 may be used determine the target harmonic frequency $\omega_0$.

The complex conjugate of the oscillator signal 128, is found by the complex conjugate module 208, and can be modeled as follows:

$$e^{-j(\omega_0 t+\theta)} \tag{3}$$

The complex conjugate o* is input to the multiplier of the down converter 132. Multiplying the feedback signal 120 by the complex conjugate o* of the oscillator signal o effectively shifts the $\omega_0$ term of the feedback signal 120 down to baseband and the $-\omega_0$ term down to $-2j\omega_0$ such that the down converted feedback signal can be mathematically represented as follows:

$$\frac{A}{2}e^{-j(\theta+\varphi_r)}+\frac{A}{2}e^{-2j(\omega_0 t-\theta+\varphi_r)} \tag{4}$$

The down converted reference signal is then input to a low pass filter of the down converter 132, the cut off frequency of which is selected to filter nearly everything except the $-j\theta$ term, including filtering the $-2j\omega_0$ term. As a result, the baseband feedback signal 134 output from the lowpass filter 275 (and from down converter 132 as shown in FIG. 4) is a baseband signal having an amplitude A of the target harmonic content of the feedback signal 120 and a phase θ equal to the phase difference between the feedback signal 120 and the oscillator signal 128 and can be represented as:

$$\frac{A}{2}e^{-j(\theta+\varphi_r)} \tag{5}$$

Thus baseband feedback signal 134 can be thought of as a DC signal having a magnitude A and a phase which is the sum of the phase $\varphi_r$ of the feedback signal 120 and the phase θ of the complex-valued oscillator 186.

Because the feedback signal 120 is mixed down to baseband, it is represented as not having a frequency component and thus is represented as a DC phasor value having only a magnitude and phase. It should, however, be understood that the baseband reference signal r can include a nominal frequency component, such as 5 Hz or 10 Hz (depending on the cutoff of LPF 275) to capture fluctuations in the reference signal and rapid shifts in RPM. To further account for this, the cut off frequency of low pass filter 275 can depend on parameters such as the change in RPM from sample to sample. In other words, the cut off frequency can be made higher for large changes in RPM and smaller for low changes.

Down converter 132 thus performs a dual function of isolating the harmonic content of the feedback signal 120 and resulting in a value representative of the harmonic content at DC, which changes, comparatively, very slowly. Thus, the remaining portions of the engine harmonic cancellation system 100 (e.g., leaky integrator 172, up converter 176, etc.) can accordingly be clocked at a value lower than other functions, such as a road-noise cancellation system if one is concurrently employed, without aliasing. This increases the efficiency of operating the harmonic cancellation system 100 (e.g., through reduced MIPS) without sacrificing performance. In addition, by down converting and operating in the time domain, rather than in the frequency domain, the harmonic frequencies can be operated on without continuity issues that would arise from doing similar operations in the frequency domain.

Figure 3:
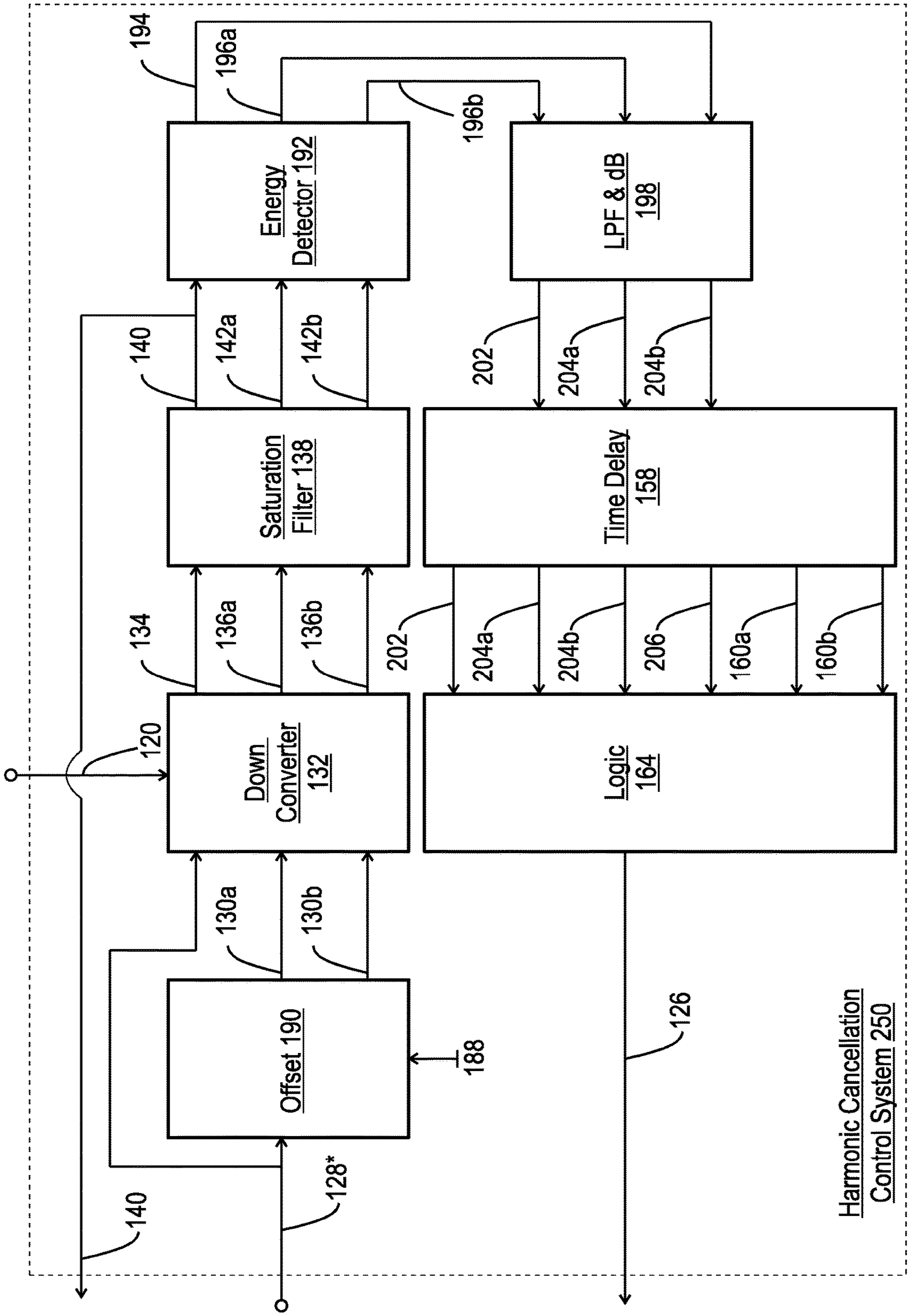
FIG. 3 depicts a block diagram of the engine harmonic cancellation adjustment system of FIG. 2, according to an example.

As will be demonstrated with reference to FIG. 3, the harmonic cancellation control system 250 processes the baseband frequency signal 134 for two purposes. First, a saturation low pass filter (LPF) 138 processes the baseband frequency signal 134 to generate a saturated feedback signal 140. The saturation LPF 138 prevents high amplitude inputs present in the feedback signal 120 from yielding high amplitude outputs in the harmonic cancellation signal 118 causing audio artifacts. Second, the harmonic cancellation control system 250 performs a sideband comparison analysis to generate a cancellation adjustment signal 126.

The saturated feedback signal 140 is provided to a leaky integrator 172 to generate a baseband cancellation signal 174. The leaky integrator 172 may be configured according to several parameters, including step size 178 and/or forgetting factor 180. For example, the baseband cancellation signal 174 may be significantly weakened by reducing the step size 178 and increasing the forgetting factor 180. Further, the cancellation adjustment signal 126 is also provided to the leaky integrator 172. The cancellation adjustment signal 126 may be used to adjust the various parameters of the leaky integrator 172, such as the step size 178 and/or the forgetting factor 180. In this way, the harmonic control cancellation system 250 may be used to temporarily reduce or eliminate noise cancellation to prevent audible audio artifacts.

The baseband cancellation signal 174 is provided to up converter 176. Conceptually, the up converter 176 is the inverse of the previously described down converter 132. The up converter 176 mixes the baseband cancellation signal 174 up to passband, resulting in the harmonic cancellation signal 118. When the harmonic cancellation signal 118 is transduced by speaker 110, an acoustic harmonic cancellation audio is generated which cancels the harmonic content of the engine noise within the cancellation zone 102 of the vehicle cabin (e.g., at a passenger's ears). As shown in FIG. 2, the up converter 176 converts the baseband cancellation signal 174 to passband according to the oscillation signal 128 generated by the previously described complex-value oscillator 186.

FIG. 3 is a block diagram of the harmonic cancellation control system 250 of FIG. 2. Broadly, the harmonic cancellation control system 250 generates the saturated feedback signal 140 and the cancellation adjustment signal 126 based on the feedback signal 120 corresponding to sound within the cancellation zone 102 of the vehicle and the complex conjugate oscillator signal 128* derived from complex-valued oscillator 186 according to the RPM signal 184. Filtering the baseband feedback signal 134 to generate the saturated feedback signal 140 limits the amplitude of the harmonic cancellation signal 118 to prevent ringing or audio artifacts. The cancellation adjustment signal 126 may temporarily reduce or eliminate noise cancellation of the harmonic cancellation signal 118 to prevent audible audio artifacts. As previously described, these audio artifacts are typically masked by road noise when the vehicle is in motion, but may be noticeable when the vehicle is parked or in an idle state, particularly when charging a battery of an electronic vehicle.

The harmonic cancellation control system 250 works in two primary ways. First, the harmonic cancellation control system 250 uses saturation analysis to prevent high amplitude inputs present in the feedback signal 120 from yielding high amplitude outputs in the harmonic cancellation signal 118 causing audio artifacts. These high amplitude inputs may correspond to a loud noise such as, for example, a knock on the window or a passenger striking an interior panel of the cabin. Second, the harmonic cancellation control system 250 uses sideband analysis around the harmonic frequency of interest to detect the presence of non-harmonic audio sources, such as human voices, in the feedback signal 120. If these non-harmonic audio sources are present in the feedback signal 120, the harmonic cancellation signal 118 may be reduced to prevent audio artifacts.

The harmonic cancellation control system 250 shown in FIG. 3 includes an offset module 190. The offset module 190 is used to enable the sideband analysis described above by generating a first frequency offset oscillation signal 130*a* and a second frequency offset oscillation signal 130*b* by adding or subtracting a frequency offset 188 to the complex conjugate oscillation signal 128*. The frequency offset oscillation signals 130*a*, 130*b* may also be referred to as sideband signals.

In one example, the first frequency offset oscillation signal 130*a* is the sum of the complex conjugate oscillation signal 128* and the frequency offset 188, while the second frequency offset oscillation signal 130*b* is the difference of the complex conjugate oscillation signal 128* and the frequency offset 188. Accordingly, if the complex conjugate oscillation signal 128* is 100 Hz and the frequency offset is 2 Hz, the first frequency offset oscillation signal 130*a* will be 102 Hz and the second frequency offset oscillation signal 130*b* will be 98 Hz. In some examples, the frequency offset 188 may correspond to the RPM signal 184. For example, the frequency offset 188 may increase as the RPMs of the engine (as indicated by the RPM signal) increase.

The harmonic cancellation control system 250 further includes the down converter 132. The down converter 132 is shown in more detail in FIG. 4. The down converter 132 is configured to mix down the feedback signal 120 from passband to baseband based on the complex conjugate oscillation signal 128*, thereby generating the baseband feedback signal 134. However, as shown in more detail in FIG. 4, the down converter 132 also mixes down the feedback signal 128 based on the first and second frequency offset oscillation signals 130*a*, 130*b*, thereby generating first and second offset baseband signals 136*a*, 136*b*. As previously described, the baseband feedback signal 134 and the offset baseband signals 136*a*, 136*b* may be further processed by low pass filter 275.

Figure 5:
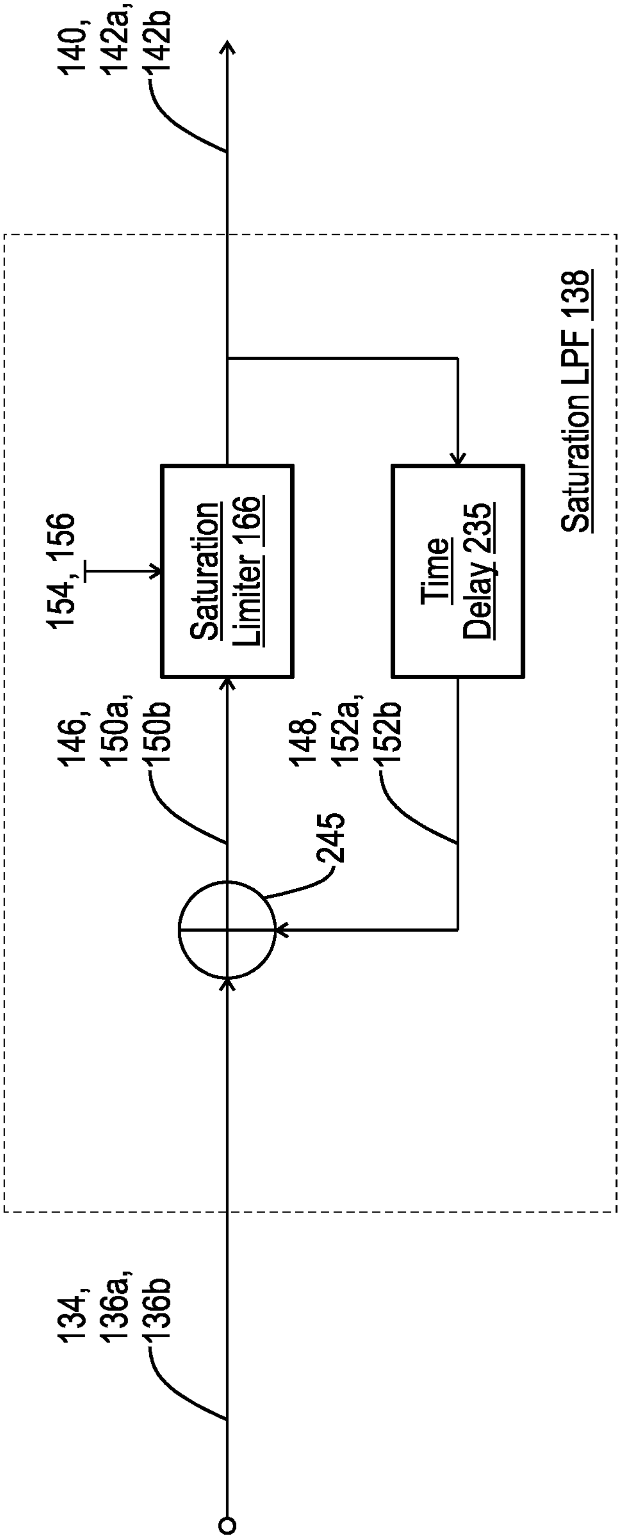
FIG. 5 depicts a block diagram of the saturation low pass filter of FIG. 3, according to an example.
Figure 6:
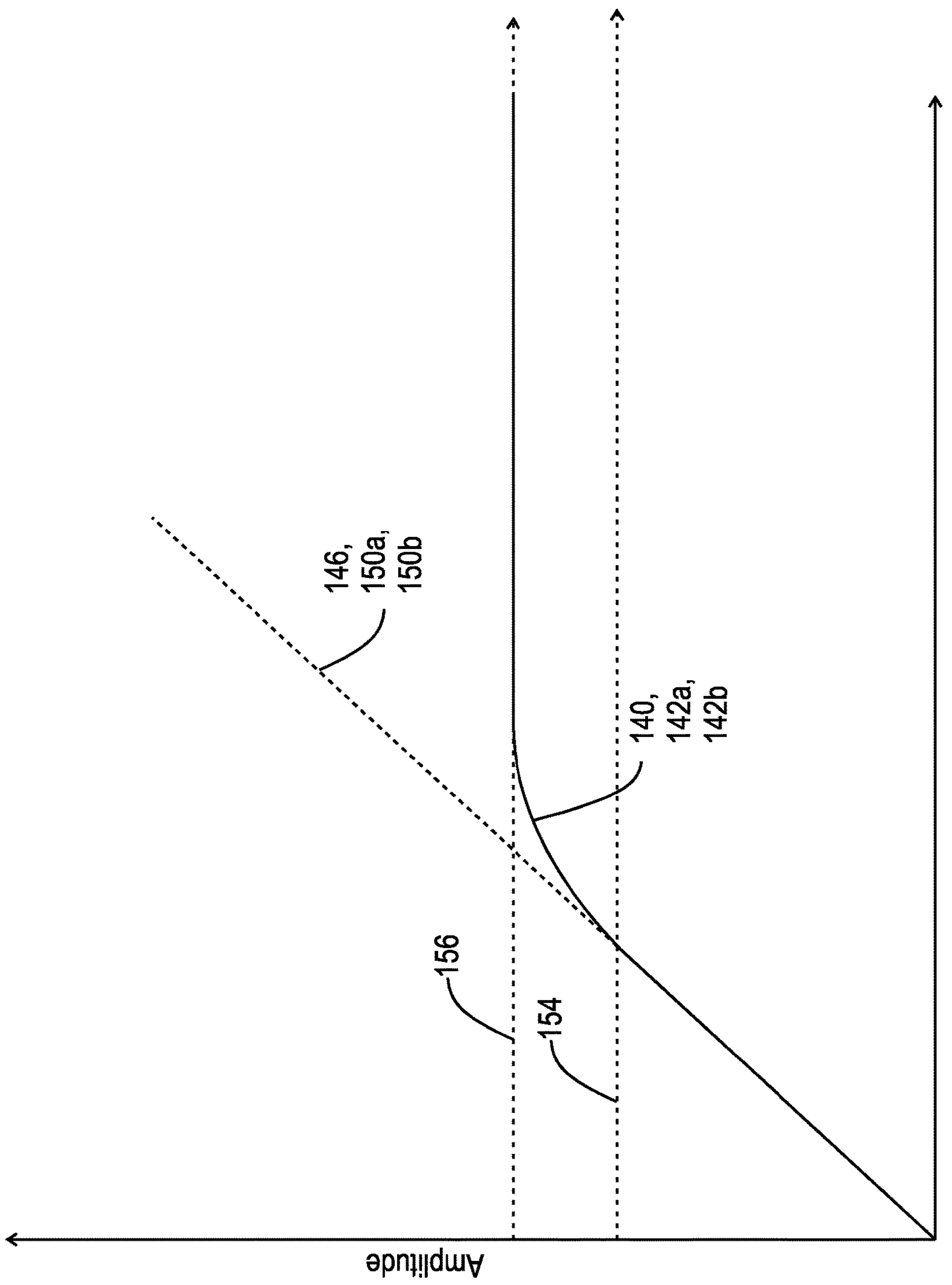
FIG. 6 depicts a plot showing an input and output of the saturation low pass filter according to hard and soft limits, according to an example.

The harmonic cancellation control system 250 further includes the saturation LPF 138. The saturation LPF 138 is shown in more detail in FIG. 5. The saturation LPF 138 in configured to limit the amplitude of the baseband feedback signal 134, the first offset baseband signal 136*a*, and the second offset baseband signal 136*b*. In doing so, the saturation LPF 138 generates a saturated feedback signal 140 based on the baseband frequency signal 134, a first offset saturated signal 142*a* based on the first offset baseband signal 136*a*, and a second offset saturated signal 142*b* based on the second offset baseband signal 136*b*. As shown in FIGS. 5 and 6, the saturation LPF 138 may control the amplitude of the saturated feedback signal 140, the first offset saturated signal 142*a*, and the second offset saturated signal 142*b* based on one or more limits, such as soft limit 154 and hard limit 156. As shown in FIG. 2, the saturated feedback signal 140 is then provided to the leaky integrator 172 to generate the baseband cancellation signal 174, which, when upconverted, is used by the speaker 110 to generate the acoustic harmonic cancellation signal 182.

The harmonic cancellation control system 250 further includes an energy detector 192. The energy detector 192 is configured to generate an energy signal corresponding to the energy level of each output from the saturation LPF 138. In the example of FIG. 3, the energy detector 192 generates a midband energy level signal 194 based on the saturated feedback signal 140, a first offset saturated signal 196*a* based on the first offset saturated signal 142*a*, and a second offset saturated signal 196*b* based on the second offset saturated signal 142*b*.

The harmonic cancellation control system 250 further includes a low pass filter (LPF) and dB unit 198. The LPF aspect of the LPF and dB unit 198 is configured to smooth the energy level signals 194, 196*a*, 196*b* generated by the energy detector 192. The dB aspect converts the smoothed energy level signal 194, 196*a*, 196*b* to dB levels. In some examples, a second LPF (or narrower bandwidth than the first LPF) may then be used to further smooth the dB levels. Accordingly, the LPF and dB unit 198 outputs a smoothed midband signal 202 based on the midband smoothed dB signal 194, a first offset smoothed dB signal 204*a* based on the first offset saturated signal 196*a*, and a second offset smoothed dB signal 204*b* based on the second offset saturated signal 196*b*.

The harmonic cancellation control system 250 further includes a time delay generator 158. The time delay generator 158 is used to generate time delayed versions of the signals provided by the LPF and dB unit 198. Accordingly, the time delay generator 158 creates a delayed midband signal 206, a first delayed offset signal 160*a*, and a second delayed offset signal 160*b*.

The harmonic cancellation control system 250 further includes a logic comparator 164. The logic comparator 164 is configured to receive the delayed midband signal 206, the first delayed offset signal 160*a*, and the second delayed offset signal 160*b* from the time delay generator 158. The smoothed midband signal 202, the first offset smoothed dB signal 204*a*, and the second offset smoothed dB signal 204*b* are also passed by the time delay generator 158 to the logic comparator 164. The logic comparator performs a sideband analysis of the aforementioned inputs to generate the cancellation adjustment signal 126 to be provided to the leaky integrator 172. Broadly, this sideband analysis compares the smoothed midband signal 202 and delayed midband signal 206 (representative of the feedback signal at the harmonic frequency of the harmonic noise) to the offset smoothed signals 204*a*, 204*b* and delayed offset signals 160*a*, 160*b* (representative of sideband frequencies offset from the harmonic frequency).

The cancellation adjustment signal 126 is configured to adjust the parameters of the leaky integrator 172 to control the level of noise cancellation provided by the harmonic cancellation system 100. The parameters of the leaky integrator 172 being adjusted may include step size 178 and forgetting factor 180. If the smoothed midband signal 202 is greater than each of the offset signals 204*a*, 204*b* and the delayed offset signals 160*a*, 160*b*, than the cancellation adjustment signal 126 will not adjust the parameters of the leaky integrator. This result is indicative of the harmonic cancellation system 100 behaving properly without feedback ringing or audio artifacts.

However, if any of the offset signals 204*a*, 204*b* and the delayed offset signals 160*a*, 160*b* are greater than the smoothed midband signal 202 or the delayed midband signal 206, then cancellation adjustment signal 126 adjusts the parameters of the leaky integrator 172 to reduce the amplitude of the baseband cancellation signal 174 (and therefore the harmonic cancellation signal 118) to a minimum harmonic cancellation level. This may be indicative of a human voice or other sound at frequencies near the frequency of the smoothed midband signal 202. Further, if the smoothed midband signal 202 is greater than each of the offset signals 204*a*, 204*b* and the delayed offset signals 160*a*, 160*b*, but the difference between the smoothed midband signal 202 and any one of the offset signals 204*a*, 204*b* and the delayed offset signals 160*a*, 160*b* is below a difference threshold, the amplitude of the baseband cancellation signal 174 (and therefore the harmonic cancellation signal 118) is reduced to an energy level greater than the minimum harmonic cancellation level. Notably, analyzing the delay signals 160*a*, 160*b*, 206 allows for earlier detection of ringing or other audio artifacts.

FIG. 4 illustrates the downconverter 132 of FIG. 3 in greater detail. The downconverter illustrates a plurality of mixers 225*a*, 225*b*, 225*c* to down convert the feedback signal 120 captured by the microphone 108 down to baseband. As shown in FIG. 2, the offset module 190 provides the down converter 132 with the complex conjugate oscillation signal 128*, the first frequency offset oscillation signal 130*a*, and the second frequency offset oscillation signal 130*b*. The first mixer 225*a* down converts the feedback signal 120 to the baseband frequency signal 134 according to the complex conjugate oscillation signal 128*. The second mixer 225*b* down converts the feedback signal 120 to the first offset baseband frequency signal 136*a* according to the first frequency offset oscillation signal 130*a*. The third mixer 225*c* down converts the feedback signal 120 to the second offset baseband frequency signal 136*b* according to the second frequency offset oscillation signal 130*b*.

FIG. 5 illustrates the saturation LPF 138 of FIG. 3 in greater detail. The saturation LPF 138 is generally configured to limit the harmonic cancellation signal 118 to prevent ringing or other audio artifacts. The saturation LPF 138 is defined by a saturation limiter 166, time delay unit 235, and an adder 245. An example output of the saturation LPF 138 is shown in FIG. 6. As shown in FIG. 5, the saturation LPF 138 receives the baseband feedback signal 134. The baseband feedback signal 134 is generated by the down converter 132 as shown in FIGS. 3 and 4.

The adder 245 is configured to sum the baseband feedback signal 134 and a time delayed saturated feedback signal 148 to generate a baseband sum 146. The baseband sum 146 is then provided to the saturation limiter 142 to generate the saturated feedback signal 140. The saturation limiter 142 is defined based on a soft limit 154 and a hard limit 156, also referred to as saturation thresholds. As is demonstrated in FIG. 6, when the baseband sum 146 exceeds the soft limit 154, the saturation limiter 166 reduces the outputted saturated feedback signal 140 to an amplitude greater than the soft limit 154 but less than the amplitude of the inputted baseband sum 146. The amplitude reduction due to the soft limit 154 may be performed according to a mathematical function, such as a proportional or logarithmic function. As further demonstrated in FIG. 6, when the baseband sum 146 exceeds the hard limit 156, the saturation limiter 166 reduces the amplitude of the saturated feedback signal 146 to the hard limit 156. In this way, the hard limit 156 acts as a hard "cut-off" used by the saturation limiter 166 to prevent the saturated feedback signal 140 from exceeding the hard limit 156. In some examples, the soft limit 154 and the hard limit 156 may vary across frequencies, such that the limits 154, 156 may be lower at more critical frequencies.

As illustrated in FIG. 5, the saturation LPF 138 includes a feedback path to the adder 245. As shown in FIG. 5, the saturated feedback signal 140 is received by a time delay block 235. The time delay block 235 is configured to delay the input saturated feedback signal 140 by a predetermined period of time to generate the time delayed saturated feedback signal 148. The time delayed saturated feedback signal 148 is then summed with the baseband feedback signal 134 to produce the baseband sum 146. Implementing the time-delayed feedback path smooths out the baseband sum 146 to prevent rapid, drastic changes to the harmonic cancellation signal 118.

The description of the signal processing of the saturation LPF 138 above was described in terms of the inputted baseband feedback signal 134. However, as shown in FIG. 5, the saturation LPF 138 also processes the first and second baseband offset signals 136*a*, 136*b* in the same manner as the baseband feedback signal 134. In particular, the adder 245 sums the fires and second baseband offset signals 136*a*, 136*b* with first and second delayed offset saturated signals 152*a*, 152*b* to generate a first and second offset sum 150*a*, 150*b*. The first and second offset sum 150*a*, 150*b* are processed by the saturation limiter 166 to generate the first and second offset saturated signals 142*a*, 142*b*. The first and second offset saturated signals 142*a*, 142*b* are fed back into the saturation LPF 138 via the time delay block 235, generating the first and second delayed offset saturated signals 152*a*, 152*b*.

Figure 7:
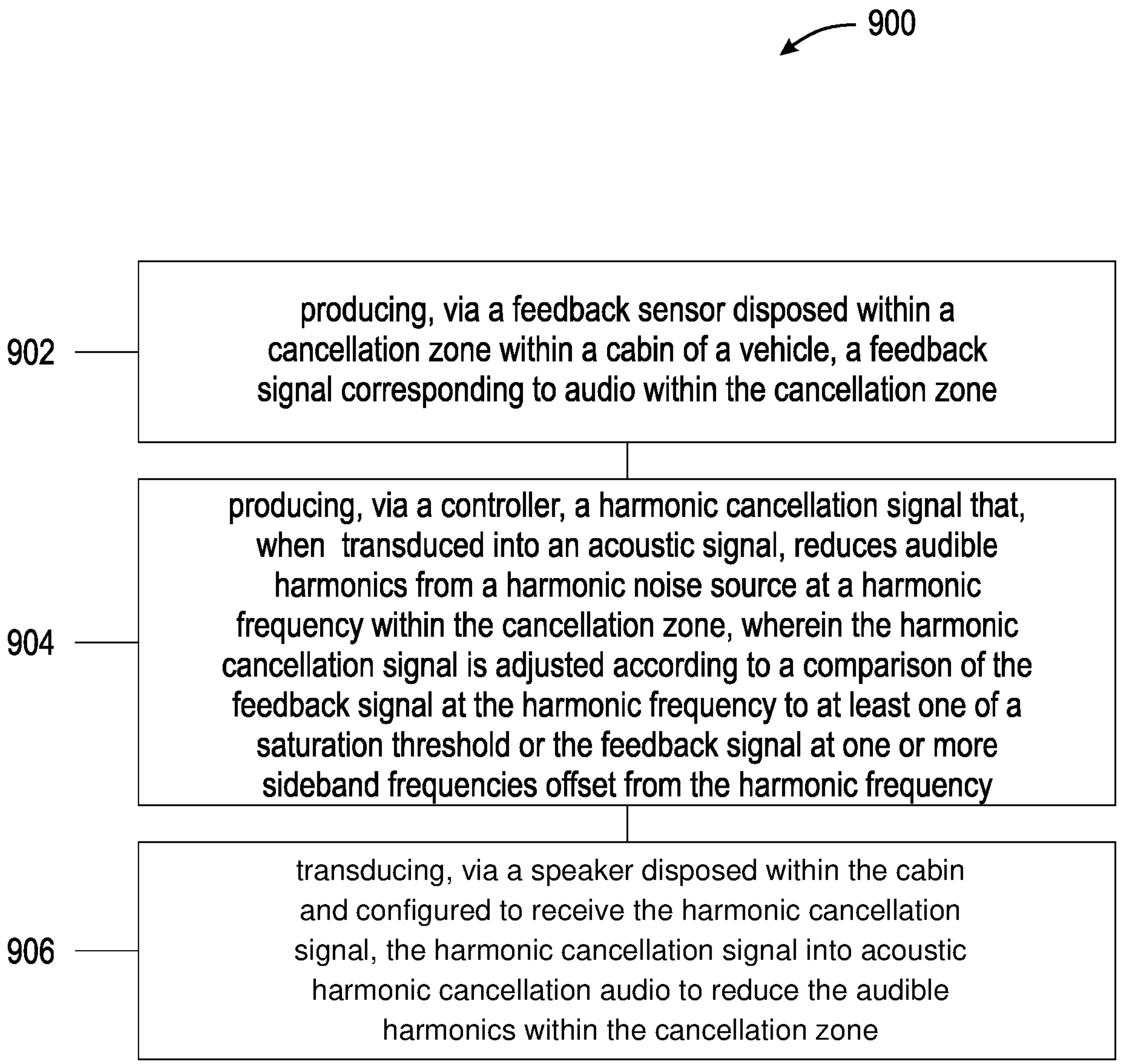
FIG. 7 depicts a method for harmonic cancellation, according to an example.

FIG. 7 depicts a method 900 for harmonic cancellation. As described above, this method 900 can be implemented by a computing device, such as controller 112. Generally, the steps of the computer-implemented method are stored in a non-transitory storage medium and are executed by the processor of the computing device. However, at least some of the steps can be carried out in hardware rather than by software.

The method 900 includes, at step 902, includes producing, via a feedback sensor disposed within a cancellation zone within a cabin of a vehicle, a feedback signal corresponding to audio within the cancellation zone.

The method 900 further includes, at step 904, producing, via a controller, a harmonic cancellation signal that, when transduced into an acoustic signal, reduces audible harmonics from a harmonic noise source at a harmonic frequency within the cancellation zone. The harmonic cancellation signal is adjusted according to a comparison of the feedback signal at the harmonic frequency to at least one of a saturation threshold or the feedback signal at one or more sideband frequencies offset from the harmonic frequency.

The method 900 further includes, at step 906, transducing, via a speaker disposed within the cabin and configured to receive the harmonic cancellation signal, the harmonic cancellation signal into acoustic harmonic cancellation audio to reduce the audible harmonics within the cancellation zone.

Figure 8:
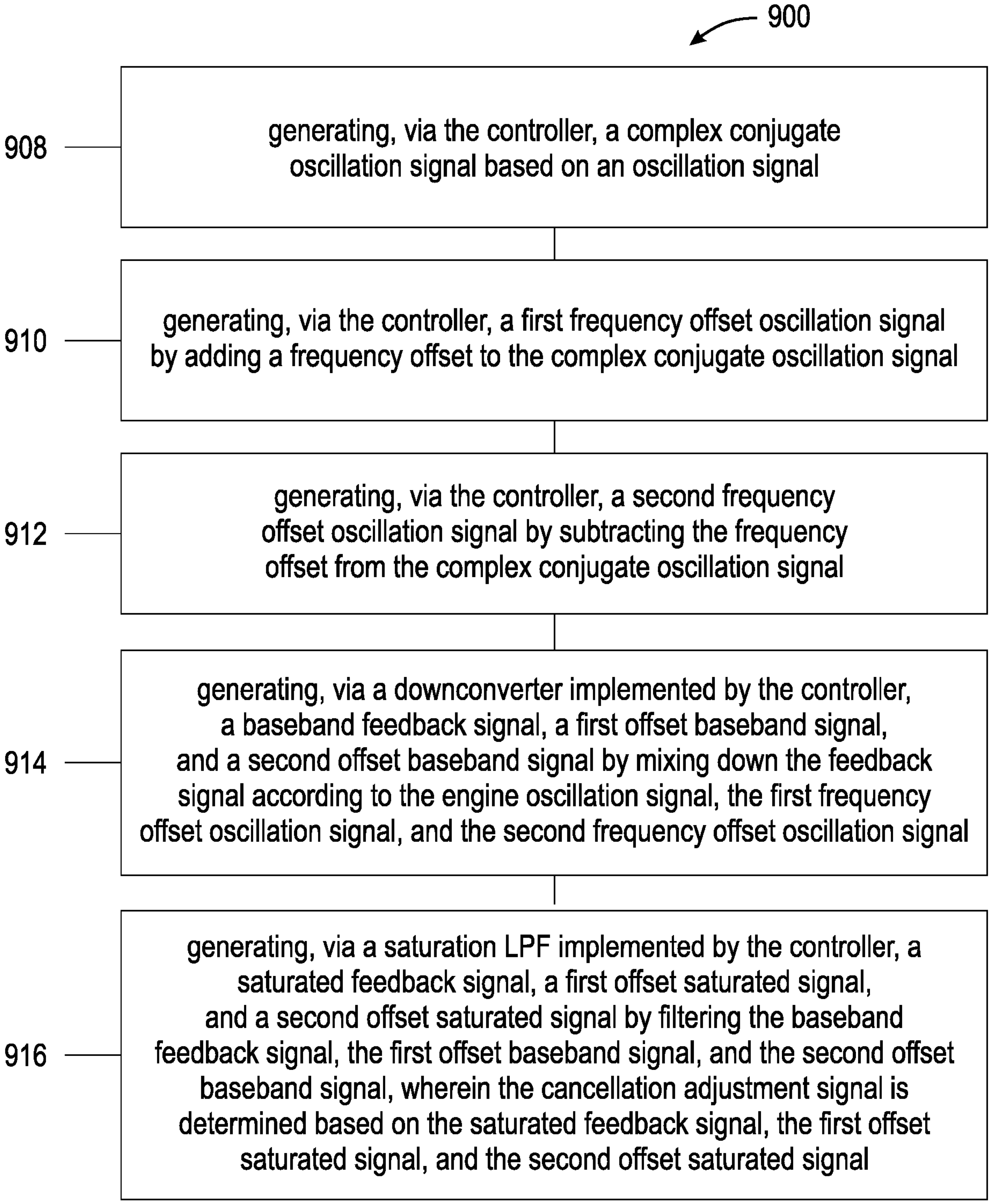
FIG. 8 depicts further aspects of the method for harmonic cancellation of FIG. 7, according to an example.

FIG. 8 depicts a non-limiting example of further steps of the method 900 for harmonic cancellation. The method 900 includes, at step 908, generating, via the controller, a complex conjugate oscillation signal based on the oscillation signal.

The method 900 further includes, at step 910, generating, via the controller, a first frequency offset oscillation signal by adding a frequency offset to the complex conjugate oscillation signal.

The method 900 further includes, at step 912, generating, via the controller, a second frequency offset oscillation signal by subtracting the frequency offset from the complex conjugate oscillation signal.

The method 900 further includes, at step 914, generating, via a downconverter implemented by the controller, a baseband feedback signal, a first offset baseband signal, and a second offset baseband signal by mixing down the feedback signal according to the oscillation signal, the first frequency offset oscillation signal, and the second frequency offset oscillation.

The method 900 further includes, at step 916, generating, via a saturation LPF implemented by the controller, a saturated feedback signal, a first offset saturated signal, and a second offset saturated signal by filtering the baseband feedback signal, the first offset baseband signal, and the second offset baseband signal. The cancellation adjustment signal is determined based on the saturated feedback signal, the first offset saturated signal, and the second offset saturated signal.

As mentioned above, the mathematical equations provided in this disclosure are simplified for the purposes of illustrating the principles of the inventive aspects only and should not be deemed exclusive or limiting in any way. Furthermore, variations in the mathematical equations are contemplated and are within the spirit and scope of this disclosure.

Regarding the use of symbols herein, a capital letter, e.g., H, generally represents a term, signal, or quantity in the frequency or spectral domain, and a lowercase letter, e.g., h, generally represents a term, signal, or quantity in the time domain. Relation between time and frequency domain is generally well known, and is described at least under the realm of Fourier mathematics or analysis, and is accordingly not presented herein. Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g., f, and discrete frequency indexes, e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

The functionality described herein, or portions thereof, and its various modifications (hereinafter "the functions") can be implemented, at least in part, via computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A harmonic cancellation system, comprising:

a feedback sensor disposed within a cancellation zone within a cabin of a vehicle and configured to produce a feedback signal corresponding to audio within the cancellation zone;

a controller configured to produce a harmonic cancellation signal that, when transduced into an acoustic signal, reduces audible harmonics from a harmonic noise source at a harmonic frequency within the cancellation zone, wherein the harmonic cancellation signal is adjusted according to a comparison of the feedback signal at the harmonic frequency to at least one of a saturation threshold or the feedback signal at one or more sideband frequencies offset from the harmonic frequency; and a speaker disposed within the cabin and configured to receive the harmonic cancellation signal and to transduce the harmonic cancellation signal into an acoustic harmonic cancellation signal within the cancellation zone, wherein the controller is further configured to:

generate a complex conjugate oscillation signal based on an oscillation signal;

generate a first frequency offset oscillation signal by adding the frequency offset to the complex conjugate oscillation signal;

generate a second frequency offset oscillation signal by subtracting the frequency offset from the complex conjugate oscillation signal;

generate, via a downconverter, a baseband feedback signal, a first offset baseband signal, and a second offset baseband signal by mixing down the feedback signal according to the oscillation signal, the first frequency offset oscillation signal, and the second frequency offset oscillation signal; and generate, via a saturation low pass filter (LPF), a saturated feedback signal, a first offset saturated signal, and a second offset saturated signal by filtering the baseband feedback signal, the first offset baseband signal, and the second offset baseband signal, wherein the harmonic cancellation signal is determined based on the saturated feedback signal, the first offset saturated signal, and the second offset saturated signal.

2. The harmonic cancellation system of claim 1, wherein the controller is further configured to determine the frequency offset based on an engine RPM signal.

3. The harmonic cancellation system of claim 1, wherein the saturation LPF is configured to generate, via a saturation limiter, the saturated feedback signal based on a baseband sum of the baseband feedback signal and a time delayed saturated feedback signal, wherein the time delayed saturated feedback signal is determine based on the saturation threshold.

4. The harmonic cancellation system of claim 3, the saturation LPF is further configured to:

generate, via the saturation limiter, the first offset saturated signal based on a first offset sum of the first offset baseband signal and a first time delayed offset saturated signal, wherein the first time delayed offset saturated signal is determine based on the saturation threshold; and generate, via, the saturation limiter, the second offset saturated signal based on a second offset sum of the second offset baseband signal and a second time delayed offset saturated signal, wherein the second time delayed offset saturated signal is determine based on the saturation threshold.

5. The harmonic cancellation system of claim 4, wherein the saturation threshold is a soft limit.

6. The harmonic cancellation system of claim 5, wherein, if an amplitude of the baseband sum exceeds the soft limit, an amplitude of the saturated feedback signal is reduced relative to the amplitude of the baseband feedback signal.

7. The harmonic cancellation system of claim 5, wherein:

if an amplitude of the first offset sum exceeds the soft limit, an amplitude of the first offset saturated signal is reduced relative to the amplitude of the first offset baseband signal; and if an amplitude of the second offset sum exceeds the soft limit, an amplitude of the second offset saturated signal is reduced relative to the amplitude of the second offset baseband signal.

8. The harmonic cancellation system of claim 4, wherein the saturation threshold is a hard limit.

9. The harmonic cancellation system of claim 8, wherein, if an amplitude of the baseband sum exceeds the hard limit, an amplitude of the saturated feedback signal is reduced to the hard limit.

10. The harmonic cancellation system of claim 8, wherein:

if an amplitude of the first offset sum exceeds the hard limit, an amplitude of the first offset saturated signal is reduced to the hard limit; and if an amplitude of the second offset sum exceeds the hard limit, an amplitude of the second offset saturated signal is reduced to the hard limit.

11. The harmonic cancellation system of claim 1, wherein the controller is further configured to generate, via a time domain delay generator, a first delayed offset signal based on the first offset saturated signal and a second delayed offset signal based on the second offset saturated signal.

12. The harmonic cancellation system of claim 11, wherein the controller is further configured to reduce the harmonic cancellation signal to a minimum harmonic cancellation level if an energy level of the saturated feedback signal is less than or equal to an energy level of at least one of the first offset saturated signal, the second offset saturated signal, the first delayed offset signal, or the second delayed offset signal.

13. The harmonic cancellation system of claim 11, wherein the controller is further configured to reduce the harmonic cancellation signal to a harmonic cancellation level greater than a minimum harmonic cancellation level if (i) an energy level of the saturated feedback signal is greater than energy levels of the first offset saturated signal, the second offset saturated signal, the first delayed offset signal, and the second delayed offset signal and (ii) the energy level of the saturated feedback signal is less than an expected signal level.

14. The harmonic cancellation system of claim 1, wherein the frequency offset is 2 Hz.

15. The harmonic cancellation system of claim 1, wherein the controller is further configured to:

generate, via a leaky integrator, a baseband cancellation signal based on the baseband feedback signal; and generate, via an upconverter, the harmonic cancellation signal by mixing the baseband cancellation signal and the oscillation signal.

16. The harmonic cancellation system of claim 15, wherein the controller is configured to adjust a step size and/or a forgetting factor of the leaky integrator based on the comparison.

17. A method for harmonic cancellation, comprising:

producing, via a feedback sensor disposed within a cancellation zone within a cabin of a vehicle, a feedback signal corresponding to audio within the cancellation zone;

producing, via a controller, a harmonic cancellation signal that, when transduced into an acoustic signal, reduces audible harmonics from a harmonic noise source at a harmonic frequency within the cancellation zone, wherein the harmonic cancellation signal is adjusted according to a comparison of the feedback signal at the harmonic frequency to at least one of a saturation threshold or the feedback signal at one or more sideband frequencies offset from the harmonic frequency; and transducing, via a speaker disposed within the cabin and configured to receive the harmonic cancellation signal, the harmonic cancellation signal into acoustic harmonic cancellation audio to reduce the audible harmonics within the cancellation zone, wherein the method further comprises:

generating, via the controller, a complex conjugate oscillation signal based on an oscillation signal;

generating, via the controller, a first frequency offset oscillation signal by adding a frequency offset to the complex conjugate oscillation signal;

generating, via the controller, a second frequency offset oscillation signal by subtracting the frequency offset from the complex conjugate oscillation signal;

generating, via a downconverter implemented by the controller, a baseband feedback signal, a first offset baseband signal, and a second offset baseband signal by mixing down the feedback signal according to the oscillation signal, the first frequency offset oscillation signal, and the second frequency offset oscillation signal; and generating, via a saturation low pass filter (LPF) implemented by the controller, a saturated feedback signal, a first offset saturated signal, and a second offset saturated signal by filtering the baseband feedback signal, the first offset baseband signal, and the second offset baseband signal, wherein the cancellation adjustment signal is determined based on the saturated feedback signal, the first offset saturated signal, and the second offset saturated signal.

18. A system to control operation of a harmonic canceller, comprising:

a feedback input to receive a feedback signal from a feedback sensor within a cancellation zone of a cabin of a vehicle, wherein the feedback signal corresponds to audio with the cancellation zone;

a controller configured to produce a harmonic cancellation signal that, when transduced into an acoustic signal, reduces audible harmonics from a harmonic noise source at a harmonic frequency within the cancellation zone, wherein the harmonic cancellation signal is adjusted according to a comparison of the feedback signal at the harmonic frequency to at least one of a saturation threshold or the feedback signal at one or more sideband frequencies offset from the harmonic frequency; and an output configured to adjust one or more parameters of the harmonic canceller according to the comparison, wherein the controller is further configured to:

generate a complex conjugate oscillation signal based on an oscillation signal;

generate a first frequency offset oscillation signal by adding the frequency offset to the complex conjugate oscillation signal;

generate a second frequency offset oscillation signal by subtracting the frequency offset from the complex conjugate oscillation signal;

generate, via a downconverter, a baseband feedback signal, a first offset baseband signal, and a second offset baseband signal by mixing down the feedback signal according to the oscillation signal, the first frequency offset oscillation signal, and the second frequency offset oscillation signal; and generate, via a saturation low pass filter (LPF), a saturated feedback signal, a first offset saturated signal, and a second offset saturated signal by filtering the baseband feedback signal, the first offset baseband signal, and the second offset baseband signal, wherein the harmonic cancellation signal is determined based on the saturated feedback signal, the first offset saturated signal, and the second offset saturated signal.

* * * * *